(12) United States Patent
Katsumata

(10) Patent No.: US 7,762,134 B2
(45) Date of Patent: Jul. 27, 2010

(54) DYNAMIC QUANTITY SENSOR

(75) Inventor: Takashi Katsumata, Kariya (JP)

(73) Assignee: DENSO CORPORATION, Kariya (JP)

( * ) Notice: Subject to any disclaimer, the term of this patent is extended or adjusted under 35 U.S.C. 154(b) by 63 days.

(21) Appl. No.: 11/892,818

(22) Filed: Aug. 28, 2007

(65) Prior Publication Data
US 2008/0066546 A1 Mar. 20, 2008

(30) Foreign Application Priority Data
Sep. 20, 2006 (JP) ............... 2006-254186

(51) Int. Cl.
G01P 9/04 (2006.01)
(52) U.S. Cl. ............... 73/504.12; 73/504.14
(58) Field of Classification Search .......... 73/504.04, 73/504.12, 504.14, 504.02, 514.32
See application file for complete search history.

(56) References Cited

U.S. PATENT DOCUMENTS

| | | | |
|---|---|---|---|
| 6,134,961 A | 10/2000 | Touge et al. | |
| 6,405,592 B1 | 6/2002 | Murari et al. | |
| 6,658,937 B2 * | 12/2003 | Ao et al. ............... | 73/504.14 |
| 6,796,180 B2 * | 9/2004 | Katsumata ............... | 73/504.14 |
| 6,845,668 B2 | 1/2005 | Kim et al. | |
| 6,906,849 B1 * | 6/2005 | Mi et al. ............... | 359/291 |
| 6,923,061 B2 * | 8/2005 | Tsubaki ............... | 73/514.32 |
| 6,935,176 B2 | 8/2005 | Goto et al. | |
| 7,000,471 B2 * | 2/2006 | Ito ............... | 73/504.12 |
| 7,043,987 B2 * | 5/2006 | Jeong et al. ............... | 73/504.12 |
| 7,062,970 B2 * | 6/2006 | Higuchi ............... | 73/504.12 |
| 7,096,732 B2 * | 8/2006 | Katsumata et al. ....... | 73/504.12 |
| 7,249,509 B2 * | 7/2007 | Hirano ............... | 73/504.12 |
| 7,276,834 B2 * | 10/2007 | Higuchi ............... | 310/309 |
| 7,290,449 B2 * | 11/2007 | Ao ............... | 73/510 |
| 7,302,847 B2 * | 12/2007 | Ito et al. ............... | 73/504.14 |
| 7,318,348 B2 * | 1/2008 | Ogino ............... | 73/504.14 |
| 7,327,004 B2 | 2/2008 | Hattori et al. | |
| 2002/0046604 A1 | 4/2002 | Ishikawa et al. | |
| 2005/0253240 A1 | 11/2005 | Nuechter et al. | |

(Continued)

FOREIGN PATENT DOCUMENTS

JP A-2000-009471 1/2000

(Continued)

OTHER PUBLICATIONS

Office Action dated May 12, 2009 from the German Patent Office in the corresponding DE Application No. 10 2007 044 204.3 (and English Translation).

Primary Examiner—Helen C. Kwok
(74) Attorney, Agent, or Firm—Posz Law Group, PLC

(57) ABSTRACT

A dynamic quantity sensor includes a base, a sensor chip made of a rectangular board having a corner portion, and a bump. The sensor chip includes a detector, and a plurality of pads. The detector has a movable part, which is displaceable when a dynamic quantity is applied thereto, and detects the dynamic quantity based on a capacitance variation in accordance with a displacement of the movable part. The bump connects the plurality of pads of the sensor chip and the base. The corner portion of the sensor chip is released from the base such that the plurality of pads of the sensor chip is arranged at a location a predetermined distance from the corner portion of the sensor chip.

23 Claims, 5 Drawing Sheets

U.S. PATENT DOCUMENTS

2006/0042382 A1 3/2006 DCamp et al.
2006/0097331 A1 5/2006 Hattori et al.

FOREIGN PATENT DOCUMENTS

| JP | A-2001-217280 | 8/2001 |
| JP | A-2003-276000 | 9/2003 |
| JP | A-2006-98168 | 4/2006 |

* cited by examiner

DYNAMIC QUANTITY SENSOR

CROSS REFERENCE TO RELATED APPLICATION

This application is based on Japanese Patent Application No. 2006-254186 filed on Sep. 20, 2006, the disclosure of which is incorporated herein by reference in its entirety.

BACKGROUND OF THE INVENTION

1. Field of the Invention

The present invention relates to a dynamic quantity sensor.

2. Description of Related Art

JP-A-2006-98168 or JP-A-2000-9471 discloses a dynamic quantity sensor having a sensor chip for detecting an angular velocity or acceleration. The sensor chip is made of a semiconductor chip including a detector, and the detector has a movable part and a fixed part. The movable part is displaced when a dynamic quantity, e.g., angular velocity or acceleration, is applied thereto. The fixed part opposes to the movable part, and the dynamic quantity can be calculated by a variation of a capacitance between the movable part and the fixed part. Typically, the sensor chip is mounted on a circuit chip, i.e., substrate, and a soft adhesion layer is disposed between the circuit chip and the sensor chip, so that a thermal strain (distortion) can be reduced.

In contrast, in JP-A-2001-217280, a semiconductor chip, e.g., IC chip, is mounted on a circuit chip by using a face-down mounting, and the semiconductor chip and the circuit chip are connected through a bump made of gold, for example.

Here, with reference to the above-described documents, the sensor chip for detecting the dynamic quantity is mounted on the substrate through the bump. At this time, a pad of the sensor chip and the substrate are connected to each other through the bump.

The sensor chip has a rectangular board shape, and the detector of the sensor chip is arranged at an approximately center position of the sensor chip. Plural pads of the sensor chip are arranged at corners of the sensor chip, respectively. That is, the plural pads are arranged outside of the detector. Therefore, when the sensor chip is connected to the substrate through the bump, the corners of the sensor chip are fixed to the substrate through the bump.

Here, when the substrate and the sensor chip are connected by the bump, stress generated by a thermal strain or sensor assembling may be directly transmitted to the sensor chip, because the bump is made of a rigid material, e.g., gold. At this time, the sensor chip may be deformed, as shown in FIGS. 7A, 7B and 7C.

Further, the dynamic quantity sensor typically includes a plurality of the detectors in the single sensor chip. If the capacitance of the detector is varied by an external disturbance, the capacitance variation generated by the external disturbance has to be eliminated by calculating a differential output of the capacitances among the plural detectors, in order to provide a target capacitance variation.

Here, as shown in FIGS. 7A and 7B, when a sensor chip 100 is deformed in a predetermined direction, e.g., X-axis or Y-axis, the capacitance variation generated by the external disturbance can be eliminated by using the differential output. However, as shown in FIG. 7C, when the sensor chip 100 is distortedly deformed, the capacitance variation generated by the external disturbance cannot be eliminated, so that a sensor characteristic, e.g., temperature characteristic, of the dynamic quantity sensor may be affected.

SUMMARY OF THE INVENTION

In view of the foregoing and other problems, it is an object of the present invention to provide a dynamic quantity sensor.

According to a first example of the present invention, a dynamic quantity sensor includes a base, a sensor chip made of a rectangular board having a corner portion, and a bump. The sensor chip includes a detector, and a plurality of pads. The detector has a movable part, which is displaceable when a dynamic quantity is applied thereto, and detects the dynamic quantity based on a capacitance variation in accordance with a displacement of the movable part. The bump electrically and mechanically connects the plurality of pads of the sensor chip and the base. The corner portion of the sensor chip is released from the base such that the plurality of pads of the sensor chip is arranged at a location a predetermined distance from the corner portion of the sensor chip.

According to a second example of the present invention, a dynamic quantity sensor includes a base, a sensor chip made of a rectangular board having a corner portion, and a bump. The sensor chip includes a first detector and a second detector, which are symmetrical to each other relative to a first line for dividing the sensor chip into two equal parts, and a plurality of pads. The bump electrically and mechanically connects the base and the plurality of pads of the sensor chip. Each of the first and second detectors has a movable part, which is driven to perform a drive vibration in a first direction approximately perpendicular to the first line, and which is detected to perform a detection vibration due to a Coliolis force generated in a second direction approximately parallel to the first line when an angular velocity is applied to the movable part, such that the angular velocity is calculated based on a capacitance variation between the movable part and a fixed part opposing to the movable part. The plurality of pads is arranged in the first line or a second line for dividing the sensor chip into two equal parts in the first direction. The plurality of pads arranged in the second line is arranged on the fixed part for detecting the drive vibration or the detection vibration. The corner portion of the sensor chip is released from the base.

According to a third example of the present invention, a dynamic quantity sensor includes a base, a sensor chip made of a rectangular board having a corner portion, and a bump. The sensor chip includes a detector and a plurality of pads. The detector is driven to perform a drive vibration in a first direction, and is detected to perform a detection vibration due to a Coliolis force generated in a second direction approximately perpendicular to the first direction when an angular velocity is applied to the detector, such that the angular velocity is calculated based on a capacitance variation of the detector. The bump electrically and mechanically connects the base and the plurality of pads of the sensor chip. The plurality of pads of the sensor chip is arranged in the first direction or the second direction to be at a location a predetermined distance from the corner portion of the sensor chip.

Accordingly, a distorted deformation of the sensor chip can be reduced.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF PREFERRED EMBODIMENT

Figure 1:
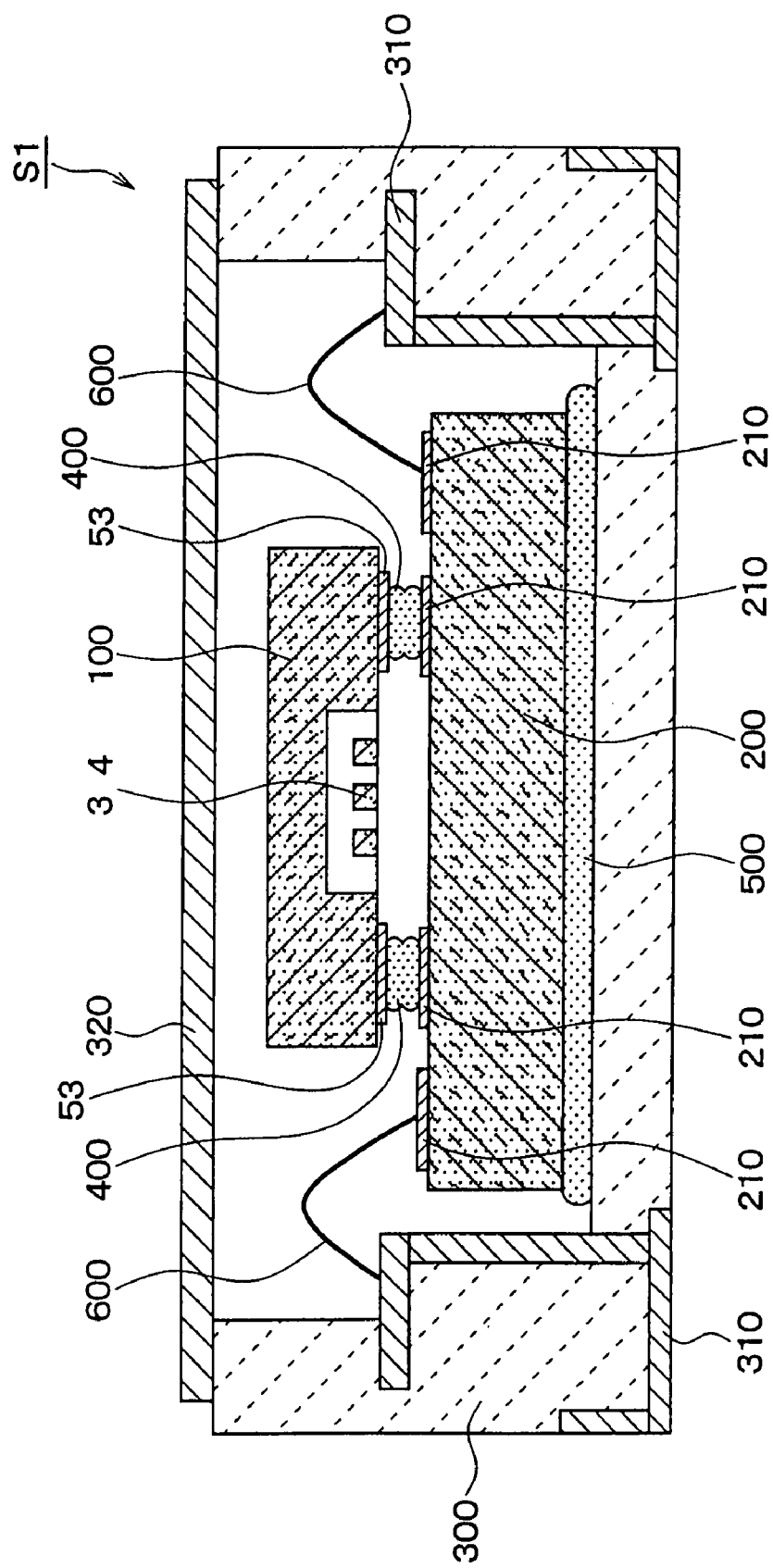
FIG. 1 is a schematic cross-sectional view showing an angular velocity sensor according to an embodiment of the present invention.

As shown in FIG. 1, an angular velocity sensor S1 (dynamic quantity sensor) includes a sensor chip 100, a circuit chip 200 (base), and a package 300. The package 300 accommodates the sensor chip 100 and the circuit chip 200. The circuit chip 200 is fixed to the package 300 through an adhesive 500. The sensor chip 100 is layered on the circuit chip 200 through a bump 400.

Figure 2:
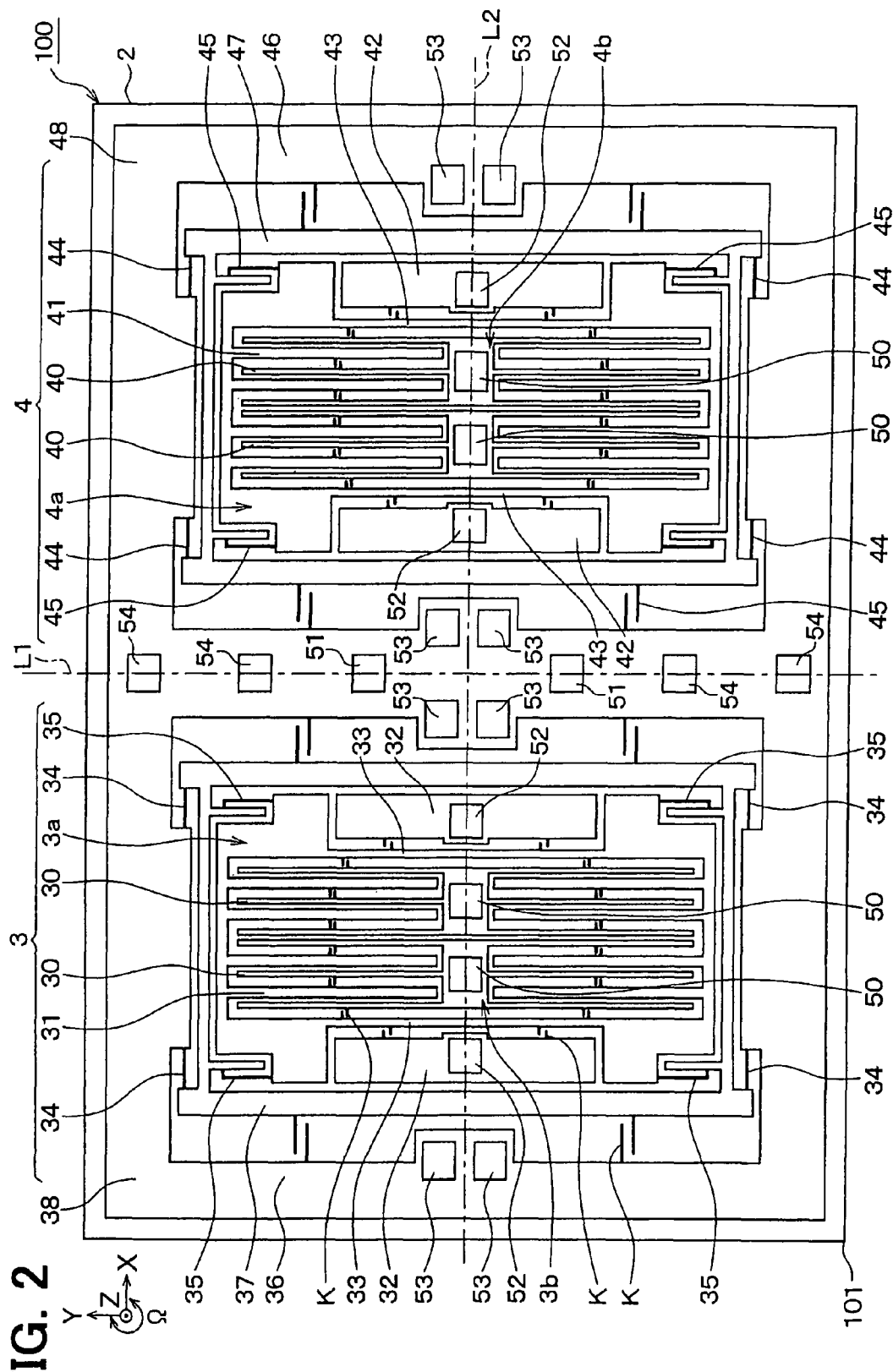
FIG. 2 is a schematic plan view showing a sensor chip of the angular velocity sensor.

FIG. 2 is a schematic plan view showing a top face of a support substrate 2 constructing the sensor chip 100. A left-and-right direction in FIG. 2 is defined to be a first direction X, and an up-and-down direction in FIG. 2 is defined to be a second direction Y. A direction approximately perpendicular to the first direction X and the second direction Y is defined to be a rotation axis Z having an angular velocity Ω.

A chained line L1 of FIG. 2 represents an imaginary line to be a center line of the sensor chip 100 in the first direction X, and a chained line L2 of FIG. 2 represents an imaginary line to be a center line of the sensor chip 100 in the second direction Y. An intersection point of the lines L1, L2 is an approximately center point of the sensor chip 100. A beam 34, 35 and a comb-teeth part K to be described below are shown in a bold (heavy) line in FIG. 2.

The sensor chip 100 includes a semiconductor substrate as the support substrate 2. The sensor chip 100 is constructed as a micro gyro sensor by performing a micro-machining technology relative to the semiconductor substrate. The micro gyro sensor is a capacitive sensor and is electrostatically driven.

As shown in FIG. 2, the sensor chip 100 includes two detectors 3, 4 on the support substrate 2 made of semiconductor. The detector 3 is arranged at a left part relative to the line L1, and the detector 4 is arranged at a right part relative to the line L1. The detectors 3, 4 are approximately axisymmetrical to each other relative to the line L1.

Next, a construction of the detector 3 will be described. The detector 4 has a construction approximately similar to that of the detector 3, so that a description of the detector 4 will be omitted. The detector 3, 4 has an approximately symmetrical shape relative to a line passing through an approximately center point between pads 50 and being parallel to the line L2.

The detector 3 includes a fixed electrode 30 and a movable electrode 31 used for performing a drive vibration, a fixed electrode 32 and a movable electrode 33 used for performing a detection vibration, a detecting beam 34, a driving beam 35, a fixed electrode 36 and a movable electrode 37 used for detecting angular velocity, and a frame 38. The frame 38 is arranged outside of the electrodes 30, 31, 32, 33, 36, 37 and the beams 34, 35.

The fixed electrodes 30, 32, 36 and the frame 38 are fixed to the support substrate 2 as a fixed part 3b. The movable electrodes 31, 33, 37 and the beams 34, 35 are movable in a direction parallel to a face of the support substrate 2 as a movable part 3a. That is, the movable part 3a is movable in the first direction X and the second direction Y.

The support substrate 2 is made of a silicon-on-insulator (SOI) board, in which an oxide film is disposed between two silicon semiconductor layers. The electrodes 30, 31, 32, 33, 36, 37, the beams 34, 35 and the frame 38 are patterned in one of the silicon semiconductor layers by etching, for example.

The movable part 3a is floating (separated) relative to the support substrate 2, because the oxide film under the movable part 3a is removed by etching as a sacrifice layer. The fixed part 3b is fixed to the oxide film of the support substrate 2. Further, as shown in FIG. 2, the fixed part 3b is surrounded by the movable part 3a as a plane arrangement pattern.

The fixed electrode 30 is arranged at an approximately center position of the detector 3, and has six bars extending in the second direction Y at each side of the line L2.

Further, the pad 50 used for driving to vibrate is made of aluminum, for example, and arranged on the fixed electrode 30. A driving voltage is applied to the fixed electrode 30 through the pad 50.

The movable electrode 31 is arranged to oppose to the bar of the fixed electrode 30. Here, the comb-teeth part K is arranged at an opposing part of the electrodes 30, 31. The comb-teeth part K extends from opposing faces of the electrodes 30, 31 toward each other.

Figure 3:
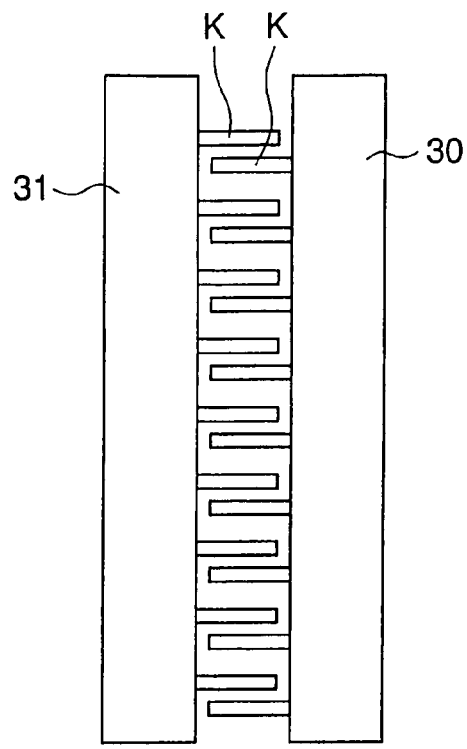
FIG. 3 is a schematic enlarged view showing a comb-teeth part of the sensor chip.

As shown in FIG. 3, the comb-teeth part K of the fixed electrode 30 and the comb-teeth part K of the movable electrode 31 oppose to each other. Although the opposing comb-teeth part K is singly shown in FIG. 2, a plurality of the opposing comb-teeth parts K is arranged between the electrodes 30, 31 in reality. Side faces of the comb-teeth parts K are arranged to engage with each other. The opposing comb-teeth parts K construct a capacitor having a capacitance therebetween.

Similarly to FIG. 3, although the opposing comb-teeth part K is singly shown between the electrodes 32, 33 or between the electrodes 36, 37 in FIG. 2, a plurality of the opposing comb-teeth parts K is arranged between the electrodes 32, 33 or between the electrodes 36, 37 in reality, and the opposing comb-teeth parts K construct a capacitor having a capacitance therebetween.

Further, the movable electrode 31 is integrated with the movable electrode 33, and the integrated electrodes 31, 33 are integrated with the movable electrode 37 through the driving beam 35, as the movable part 3a. The integrated electrodes 31, 33, 37 are connected to the frame 38 through the detecting beam 34.

Here, as shown in FIG. 2, a pad 51 for the movable part 3a is made of aluminum, for example, and disposed on the frame 38 at an approximately center position of the sensor chip 100. The movable part 3a is electrically connected to the pad 51, and a predetermined voltage is applied to the movable part 3a through the pad 51.

Two of the fixed electrodes 32 are arranged outside of the electrodes 30, 31. A pad 52 used for detecting the movable part 3a to vibrate is disposed on the fixed electrode 32, so that an electric potential of the fixed electrode 32 is measured through the pad 52.

The movable electrode 33 is arranged at both sides (left and right) of the movable electrode 31. Each of the movable electrodes 33 opposes to the fixed electrode 32. The opposing part of the electrodes 32, 33 has the comb-teeth parts K, similarly to FIG. 3.

The movable electrodes 31, 33 are integrated with each other. The movable electrode 37 is arranged outside of the movable electrodes 31, 33, and is connected to the movable electrodes 31, 33 through the driving beam 35. Here, due to the driving beam 35, the movable electrodes 31, 33 are movable in the first direction X.

The movable electrode 37 has a frame shape. The movable electrodes 31, 33 and the beams 34, 35 are surrounded by the movable electrode 37. The frame 38 is arranged outside of the movable electrode 37, and the movable electrode 37 is connected to the frame 38 through the detecting beam 34. The detecting beam 34 is a cantilever beam relative to the support substrate 2, because the detecting beam 34 is supported by the support substrate 2 through the fixed electrode 36. Thereby, each electrode or beam of the movable part 3a is supported by the support substrate 2 through the detecting beam 34. Due to the detecting beam 34, the whole movable part 3a is movable in the second direction Y.

Further, the fixed electrode 36 opposes to the movable electrode 37, and the opposing part of the electrodes 36, 37 has the comb-teeth parts K, similarly to FIG. 3. The fixed electrode 36 is a part of the frame 38, and is arranged at a left side and a right side relative to the detector 3.

A pad 53 used for detecting angular velocity is made of aluminum, for example, and is disposed on the frame 38. The fixed electrode 36 is electrically connected to the pad 53, so that an electric potential of the fixed electrode 36 is measured through the pad 53.

The detector 4 has an approximately the same construction as the detector 3. The electrodes 30, 31, 32, 33, 36, 37 of the detector 3 correspond to electrodes 40, 41, 42, 43, 46, 47 of the detector 4, respectively. The beams 34, 35 of the detector 3 correspond to beams 44, 45 of the detector 4, respectively. The frame 38 of the detector 3 corresponds to a frame 48 of the detector 4.

The fixed electrodes 40, 42, 46 and the frame 48 construct a fixed part 4b, which is fixed to the support substrate 2. The movable electrodes 41, 43, 47 and the beams 44, 45 construct a movable part 4a, which is movable in the first direction X and the second direction Y.

The pads 50, 51, 52, 53 are arranged on the detector 4, similarly to the detector 3. Two of the pads 51 are shown in FIG. 2. One of the pads 51 is used for the detector 3, and the other one of the pads 51 is used for the detector 4.

Here, a dummy pad 54 is disposed on the sensor chip 100 in addition to the pads 50, 51, 52, 53. The dummy pad 54 is made of aluminum, for example, and does not have any electrical usage. The dummy pad 54 is arranged on the line L1 of the sensor chip 100 together with the pad 51.

The detectors 3, 4 and the pads 50, 51, 52, 53, 54 are arranged on the same face of the sensor chip 100. As shown in FIG. 2, the pads 50, 51, 52, 53, 54 are arranged in a characteristic arrangement, that is, in a cross shape having an approximately center point of the sensor chip 100 as its cross point. Here, the sensor chip 100 has a rectangular shape constructed with four sides, and the cross-shaped arrangement extends from the cross point toward each approximately center point of the four sides.

Further, the sensor chip 100 includes the two detectors 3, 4, which are symmetrical to each other relative to the line L1. The pads 50, 51, 52, 53, 54 are arranged along the line L1 or the line L2, which is approximately perpendicular to each other. Especially, the pad 51 and a part of the pads 53 are arranged at an approximately center position of the sensor chip 100.

Further, the pad 50 and the pad 52 are arranged in a detector area of the sensor chip 100, in which the detector 3, 4 is disposed. Furthermore, the pad 50 and the pad 52 are arranged in a fixed part area of the sensor chip 100, in which the fixed part 3b, 4b is disposed.

Further, the pads 50, 51, 52, 53, 54 are arranged along the line L1 or the line L2, which imaginarily divides the sensor chip 100 into two equal parts. Therefore, the pads 50, 51, 52, 53, 54 are arranged along the first direction X or the second direction Y.

In a conventional art, the pad 50, 51, 52, 53, 54 is arranged adjacent to a corner 101 (see FIG. 4) of the sensor chip 100 having the rectangular shape. However, in this embodiment, the pad 50, 51, 52, 53, 54 is not arranged adjacent to the corner 101 of the sensor chip 100. That is, the pad 50, 51, 52, 53, 54 is arranged at a location a predetermined distance from the corner 101. The pad 50, 51, 52, 53, 54 is not arranged in a shaded area of FIG. 4, which is adjacent to the corner 101 of the sensor chip 100.

Figure 4:
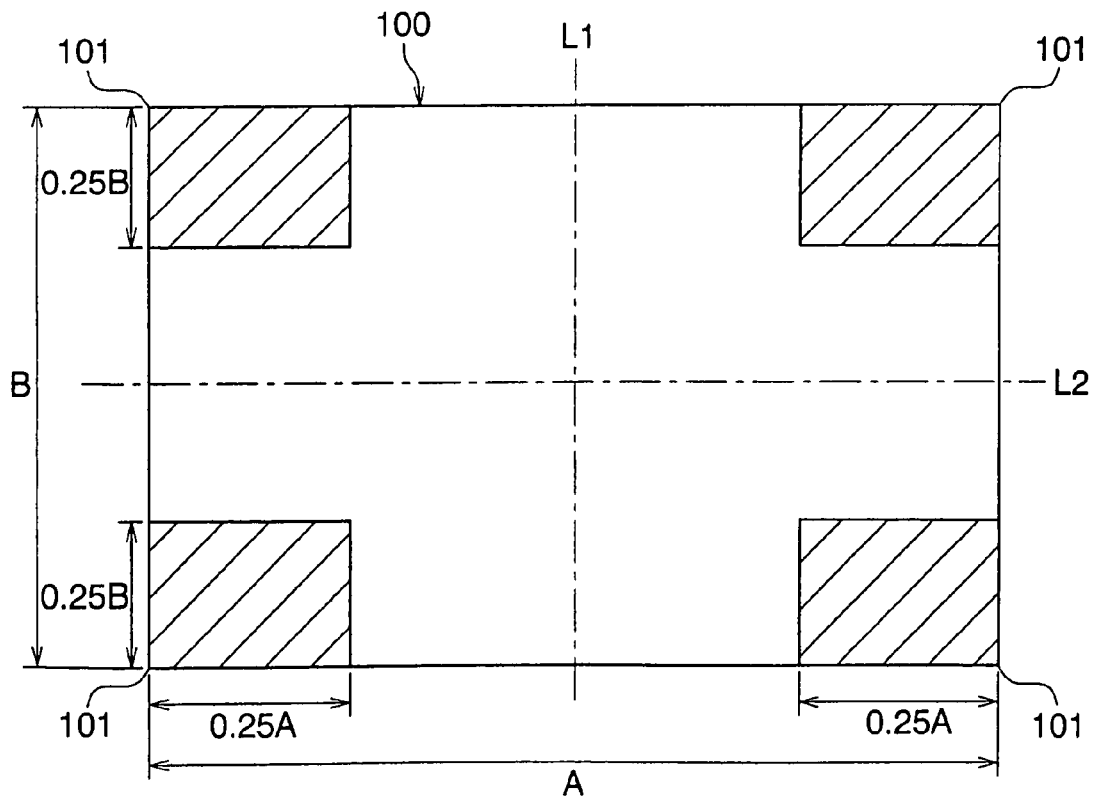
FIG. 4 is a schematic plan view showing a corner portion of the sensor chip, in which a pad is not to be disposed.

As shown in FIG. 4, when a long side of the sensor chip 100 is defined to have a length A, and when a short side of the sensor chip 100 is defined to have a length B, the shaded area is a rectangle having a long side length of 0.25A and a short side length of 0.25B. One of corners of the shaded area corresponds to the corner 101 of the sensor chip 100.

As shown in FIG. 1, the pad 53 is connected to the bump 400 made of gold, for example. In this embodiment, the pad 50, 51, 52, 53, 54 is connected to the bump 400, and the detector 3, 4 is arranged in the sensor chip 100 to oppose to the circuit chip 200.

The bump 400 is connected to a pad 210 of the circuit chip 200. The bump 400 may be made of any known material, and may be produced by any known method. The sensor chip 100 and the circuit chip 200 may be connected to each other by the bump 400 in any known method. Thus, the sensor chip 100 and the circuit chip 200 are electrically and mechanically connected to each other through the bump 400.

Because the pads 50, 51, 52, 53, 54 have the arrangement shape shown in FIG. 2, any pad is not arranged adjacent to the corner 101 (see FIG. 4) of the sensor chip 100. Therefore, the corner 101 of the sensor chip 100 is not fixed to the circuit chip 200. That is, the corner 101 of the sensor chip 100 is released from the circuit chip 200 and the bump 400.

Because the pads 50, 51, 52, 53, 54 are arranged in the cross shape, and because the bump 400 is connected to the pad 50, 51, 52, 53, 54, an arrangement of the bump 400 has approximately the same cross shape including the approximately center point of the sensor chip 100. Due to the bump 400, the sensor chip 100 and the circuit chip 200 can be connected to each other.

Here, for example, the circuit chip 200 may be made of a silicon substrate having a MOS transistor or a bipolar transistor, which is formed by using a known semiconductor process. In this case, the circuit chip 200 may supply electricity to the sensor chip 100. Further the circuit chip 200 may process an electrical signal output from the sensor chip 100, and may output the processed signal outward.

As shown in FIG. 1, the circuit chip 200 is fixed on the package 300 through the adhesive 500. Here, the adhesive 500 may be made of silicon resin, epoxy resin or polyimide resin, for example.

Here, the package 300 includes a wiring 310 therein or thereon. The circuit chip 200 and the wiring 310 of the package 300 are electrically connected to each other through a bonding wire 600 made of gold or aluminum, for example. A signal output from the circuit chip 200 is transmitted to the package 300 through the bonding wire 600, and the transmitted signal is sent from the wiring 310 of the package 300 outward.

The package 300 may be made of a layered substrate, in which plural ceramic (alumina) layers are layered. In this case, the wiring 310 is arranged between the layers of the layered substrate, and the wirings 310 are conductive to each other due to a through hole provided between the layers of the layered substrate.

As shown in FIG. 1, the package 300 has an opening, and a lid 320 is mounted to the opening of the package 300. The lid 320 may be made of any material, for example, metal, resin or ceramic. The lid 320 may be connected to the package 300 by an adhesive or brazing, for example. Due to the lid 320, an inner space of the package 300 is air-tightly sealed.

Next, a method of activating the angular velocity sensor S1 will be described. The circuit chip 200 applies a predetermined driving voltage to the sensor chip 100 through the pads 50, 51, in order to drive the movable part 3a, 4a.

When the driving voltage is applied to the pads 50, 51, a capacitor is formed between the fixed electrode 30, 40 and the movable electrode 31, 41, and the capacitor generates an electrostatic attraction force in accordance with a periodic variation of an alternating component of the driving voltage. Thereby, due to the driving beam 35, 45, the movable electrode 31, 41 and the movable electrode 33, 43 integrally and periodically vibrate in the first direction X.

Here, when the alternating component of the driving voltage is made reversed from each other between the detectors 3, 4, the movable electrode 31, 33 of the detector 3 and the movable electrode 41, 43 of the detector 4 vibrate in a direction opposite to each other.

At this time, in accordance with the periodic vibration, an overlap amount of the comb-teeth parts K between the fixed electrode 32, 42 and the movable electrode 33, 43 is varied. Thereby, a capacitance of the capacitor formed between the fixed electrode 32, 42 and the movable electrode 33, 43 is varied.

The variation of the capacitance is measured through the electric potential of the pad 52 connected to the fixed electrode 32, 42. Thereby, an amount of the periodic vibration can be monitored. Therefore, in order to make the amount of the periodic vibration to be a predetermined value, a feedback control is performed relative to the driving voltage in accordance with the amount of the periodic vibration.

In this state, when an angular velocity Ω is input around the rotation axis Z of FIG. 2, Coliolis force is generated. Due to a deformation of the detecting beam 34, 44, the movable electrode 37, 47 of the movable part 3a, 4a vibrates in the second direction Y to detect the angular velocity Ω.

Thereby, a gap (capacitor) of the comb-teeth parts K between the movable electrode 37, 47 of the movable part 3a, 4a and the fixed electrode 36, 46 of the fixed part 3b, 4b is varied, so that a capacitance of the gap (capacitor) is varied.

Because the electric potential of the fixed electrode 36, 46 is varied in accordance with the capacitance variation, the angular velocity Ω can be detected when the electric potential of the fixed electrode 36, 46 is measured through the circuit chip 200. Here, an output difference of the electric potentials of the fixed electrodes 36, 46 is calculated between the detectors 3, 4.

According to this embodiment, the sensor chip 100 includes the detectors 3, 4 and the pads 50, 51, 52, 53, 54 on the same face. The detector 3, 4 includes the movable part 3a, 4a, which is displaced when the angular velocity is applied thereto. The angular velocity is detected based on the capacitance variation between the movable part 3a, 4a and the fixed part 3b, 4b opposing to the movable part 3a, 4a.

Further, the pads 50, 51, 52, 53, 54 of the sensor chip 100 and the circuit chip 200 are electrically and mechanically connected to each other through the bump 400. Because the pads 50, 51, 52, 53, 54 are not arranged adjacent to the corner 101 of the sensor chip 100, the corner 101 of the sensor chip 100 is released from the circuit chip 200.

Figure 7A:
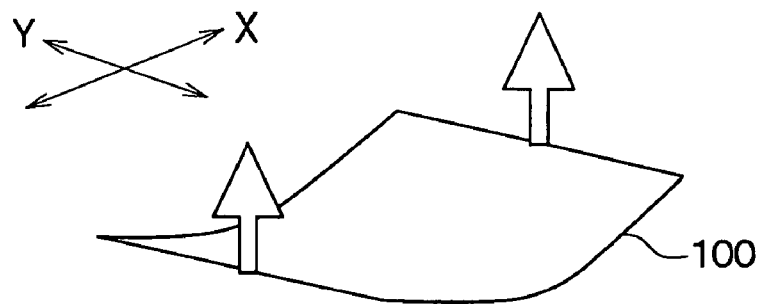
FIGS. 7A, 7B and 7C are diagrams showing a deformation example of the sensor chip.
Figure 7B:
Figure 7C:
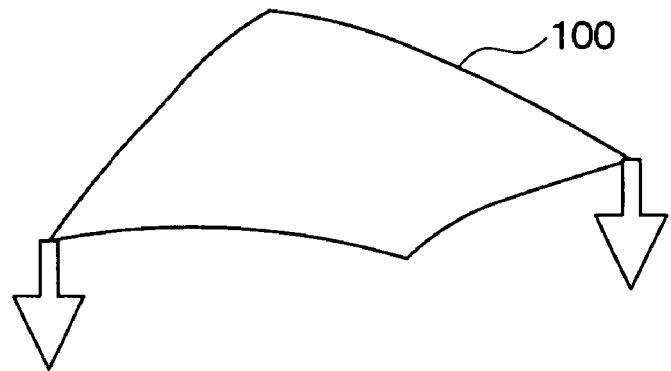

The distorted deformation of the sensor chip 100 shown in FIG. 7C is generated when the corner 101 of the sensor chip 100 is fixed to the circuit chip 200. However, in this embodiment, the distorted deformation of the sensor chip 100 can be restricted, because the corner 101 of the sensor chip 100 is not fixed to the circuit chip 200, that is, the corner 101 of the sensor chip 100 is released from the circuit chip 200.

Specifically, the distorted deformation of the sensor chip 100 is caused when a distorted deformation of the circuit chip 200 is transmitted to the sensor chip 100 through the bump 400. That is, the sensor chip 100 has a supporting point, at which the sensor chip 100 is fixed to the circuit chip 200 through the bump 400, and the sensor chip 100 is distortedly deformed at the supporting point.

If two bumps 400 are symmetrically disposed relative to the center point of the sensor chip 100, i.e., intersection point of the lines L1, L2, an amount of the distorted deformation of the sensor chip 100 is proportional to a distance between the two bumps 400. The distorted deformation of the sensor chip 100 is generated in a direction approximately perpendicular to a line connecting the two bumps 400.

Based on these relationships, when the corner 101 of the sensor chip 100 is released from the circuit chip 200, the distorted deformation shown in FIG. 7C can be restricted from being generated. Further, the amount of the distorted deformation can be reduced, when the most external bump 400 of the sensor chip 100 is located adjacent to the center point of the sensor chip 100, compared with a case in which the most external bump 400 of the sensor chip 100 is located adjacent to the corner 101 of the sensor chip 100.

Further, a part of the pads 53 used for detecting angular velocity, and the pad 51 used for the movable part 3a are arranged at approximately the center position of the sensor chip 100 in this embodiment. Thereby, the approximately the center position of the sensor chip 100 is connected to the circuit chip 200 through the bump 400. Therefore, strength for supporting the sensor chip 100 can be increased.

Further, the pad 50 used for driving the movable part 3a to vibrate, and the pad 52 used for detecting the movable part 3a to vibrate are arranged in the detector area of the sensor chip 100, in which the detector 3, 4 is disposed. Especially, the pads 50, 52 are arranged in the fixed part area of the sensor chip 100, in which the fixed part 3b, 4b is disposed.

The movable part 3a, 4a has an approximately frame shape, and the fixed part 3b, 4b is disposed at an inner periphery of the frame shape. In this case, conventionally, a part of the frame shape has to be cut to arrange a wiring of the fixed part 3b, 4b, or multi-layered wiring construction is needed, in which a wiring layer is further arranged at a lower part of the support substrate 2. Thus, wiring construction has been complex.

However, in this embodiment, the pads 50, 52 are arranged on the fixed part 3b, 4b located at the inner periphery of the movable part 3a, 4a. Thereby, the cutting of the frame shape or the multi-layered wiring construction is not needed. Further, the pad 50, 52 can be connected to the circuit chip 200 at the shortest distance. Thus, wiring construction can be simple.

Further, the pads 50, 52 arranged in the fixed part area of the sensor chip 100 are arranged in the line L2, i.e., first direction X. That is, the pads 50, 52 are arranged in a vibration direction in which the movable electrode 31, 33 is driven to vibrate.

If the pad 50, 52 arranged in the fixed part area of the sensor chip 100 is out of the arrangement, the distorted deformation of the sensor chip 100 is easily generated. However, in this embodiment, the pads 50, 52 are arranged in the vibration direction, so that the distorted deformation of the sensor chip 100 can be restricted.

Further, the pad 51 used for the movable part 3a and the dummy pad 54 are arranged in the line L1, i.e., second direction Y. That is, the pads 51, 54 are arranged in a detection direction in which the movable electrode 37 vibrates.

Further, the pads 50, 51, 52, 53, 54 are arranged in the cross shape shown in FIG. 2. Thereby, the bump 400 secures to have strength for supporting the sensor chip 100. Further, an inclination of the sensor chip 100 relative to the circuit chip 200 can be restricted, so that the sensor chip 100 can be kept in a horizontal state.

Further, in this embodiment, the dummy pad 54 is used in addition to the pads 50, 51, 52, 53 having the electrical usage. If the cross shape shown in FIG. 2 is to be constructed by only the pads 50, 51, 52, 53, the number of pads may be insufficient for constructing the cross shape. However, in this embodiment, the dummy pad 54 is used in order to secure the number of pads needed for constructing the cross shape. Thus, the strength for supporting the sensor chip 100 can be improved, and the inclination of the sensor chip 100 can be restricted.

The dummy pad 54 is not conductive to the sensor chip 100 or the circuit chip 200. However, the dummy pad 54 may be mechanically connected to the sensor chip 100 or the circuit chip 200, or the dummy pad 54 may be used to have a fixed electric potential, e.g., GND.

Other Embodiments

Figure 5:
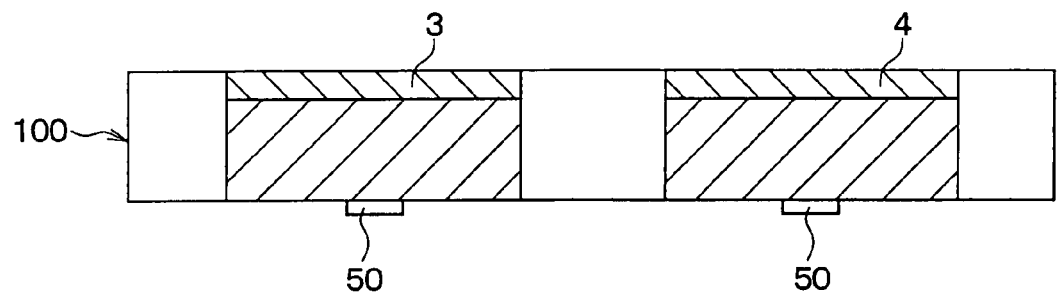
FIG. 5 is a schematic side view showing a detector area of the sensor chip according to another embodiment.

The detector area or the fixed part area of the sensor chip 100 represents a shaded area shown in FIG. 5. The shaded area is constructed by a first face of the sensor chip 100, on which the detector 3, 4 is arranged, and a second face of the sensor chip 100 opposite to the first face. That is, the pad 50, 51, 52, 53, 54 may be arranged on the second face of the sensor chip 100, when the detector 3, 4 is arrange on the first face of the sensor chip 100, as shown in FIG. 5. Although only the pad 50 is shown in FIG. 5, the pad 51, 52, 53, 54 may be arranged on the second face of the sensor chip 100.

Further, in this case, the pad 50, 51, 52, 53, 54 and the detector 3, 4 are electrically connected through a through-type electrode (not shown) disposed in the sensor chip 100, because the pad 50, 51, 52, 53, 54 and the detector 3, 4 are arranged on different faces of the sensor chip 100.

Further, in the above embodiment, the sensor chip 100 is connected to the circuit chip 200 such that the first face of the sensor chip 100 having the detector 3, 4 opposes to the circuit chip 200. That is, the sensor chip 100 is connected to the circuit chip 200 in the face-down state. However, when the pad 50, 51, 52, 53, 54 and the detector 3, 4 are arranged on different faces of the sensor chip 100, the sensor chip 100 is connected to the circuit chip 200 such that the second face of the sensor chip 100 having the pad 50, 51, 52, 53, 54 opposes to the circuit chip 200.

Further, because the pad 50, 51, 52, 53, 54 is restricted from being arranged adjacent to the corner 101 of the sensor chip 100, the pads 50, 51, 52, 53, 54 are arranged in the cross shape in the above embodiment. However, the arrangement of the pads 50, 51, 52, 53, 54 may be any arrangement without departing from the scope of the present disclosure. For example, all of the pads 50, 51, 52, 53, 54 may be arranged at an approximately center part of the sensor chip 100. In this case, the sensor chip 100 may easily incline relative to the circuit chip 200, compared with a case where the pads 50, 51, 52, 53, 54 are arranged in the cross shape.

Further, the pad 51, 53 may not be arranged at approximately the center position of the sensor chip 100. Only one of the pads 50, 51, 52, 53, 54 may be arranged at approximately the center position of the sensor chip 100. Furthermore, as shown in FIG. 6, any pad may not be arranged at approximately the center position of the sensor chip 100, when the pad 50, 51, 52, 53, 54 is not arranged adjacent to the corner 101 of the sensor chip 100.

Figure 6:
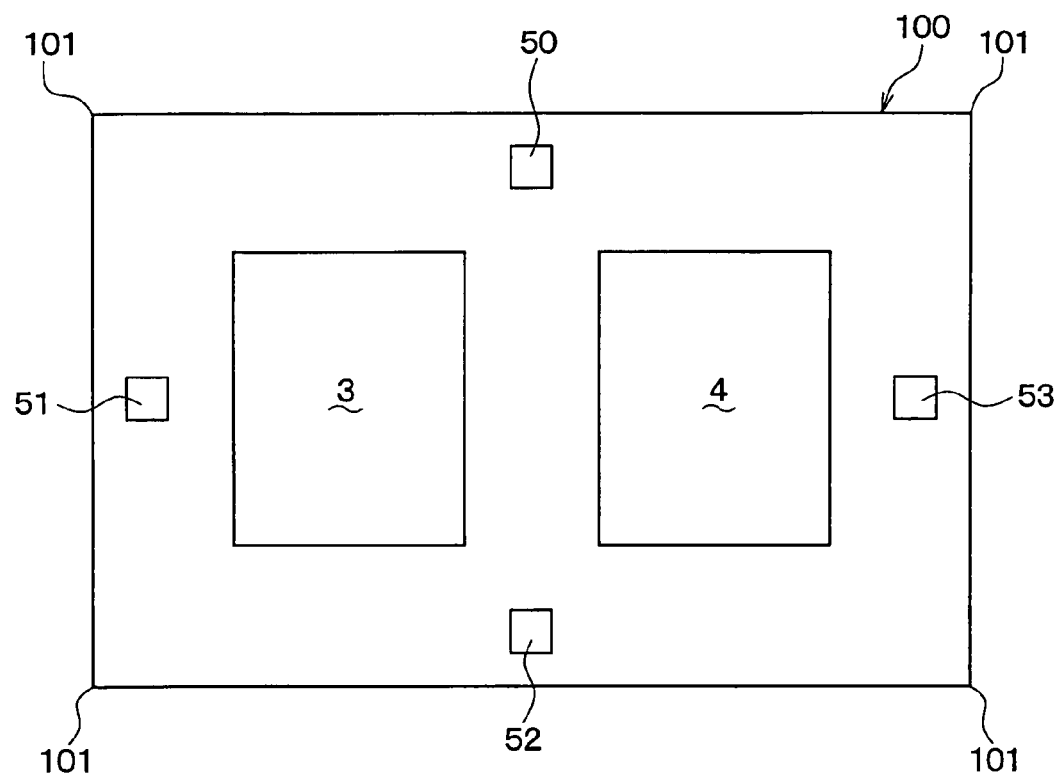
FIG. 6 is a schematic plan view showing another pad arrangement of the sensor chip according to another embodiment.

As shown in FIG. 6, the sensor chip 100 has a rectangular board shape constructed with four sides, and the pad 50, 51, 52, 53 is arranged adjacent to each center position of the sides of the sensor chip 100. Any pad is not arranged adjacent to the corner 101 of the sensor chip 100. Thereby, the distorted deformation of the sensor chip 100 can be restricted, similarly to the above embodiment.

Further, the pads 50, 52 are arranged in the fixed part area or the detector area of the sensor chip 100. However, only one of the pads 50, 51, 52, 53, 54 may be arranged in the fixed part area or the detector area of the sensor chip 100, based on a construction of the detector 3, 4.

Further, a construction of the movable part 3a, 4a or the fixed part 3b, 4b of the detector 3, 4 is not limited to the above embodiment. The construction of the movable part 3a, 4a or the fixed part 3b, 4b of the detector 3, 4 may be any construction without departing from the scope of the present disclosure.

For example, while the arrangement of the detector 3, 4 is kept to be similar to FIG. 2, a design of the electrode or the beam of the detector 3, 4 may be changed. Thereby, the first direction X in FIG. 2 may be defined to be the detection direction for detecting vibration, and the second direction Y in FIG. 2 may be defined to be the driving direction in which the movable part 3a is driven to vibrate.

In this case, the pads 50, 52 are arranged in the detection direction, differently from the above embodiment. However, approximately the same advantage can be provided in this case, so that the distorted deformation of the sensor chip 100 can be restricted.

Further, the sensor chip 100 includes both of the detector 3 and the detector 4 in the above embodiment. Alternatively, the sensor chip 100 may include only one of the detectors 3, 4. Further, the sensor chip 100 may include three or more detectors.

The detector 3, 4 includes the movable part 3a, 4a, which is displaceable when a dynamic quantity is applied to the movable part 3a, 4a. The dynamic quantity is detected based on a capacitance variation in accordance with the displacement of the movable part 3a, 4a. The detector 3, 4 may be used in an acceleration sensor other than the angular velocity sensor S1.

In this case, the movable part 3a, 4a is displaced when acceleration is applied thereto, and the capacitance variation between the movable part 3a, 4a and the fixed part 3b, 4b is detected. When the detector 3, 4 is used in the acceleration sensor, the pads may be arranged in a direction for detecting the acceleration, which corresponds to a direction in which the movable part 3a, 4a is displaced due to the acceleration.

Further, for example, a print wiring board, a ceramic wiring board, a lead frame or a bus bar may be used as the circuit chip 200, i.e., a base to be connected to the sensor chip 100 through the bump 400.

Such changes and modifications are to be understood as being within the scope of the present invention as defined by the appended claims.

What is claimed is:

1. A dynamic quantity sensor comprising:
a base;
a sensor chip made of a rectangular board having a corner portion, the sensor chip including
a detector having a movable part, which is displaceable when a dynamic quantity is applied thereto, wherein the detector detects the dynamic quantity based on a capacitance variation in accordance with a displacement of the movable part, and
a plurality of pads; and
a bump for electrically and mechanically connecting the plurality of pads of the sensor chip and the base, wherein
the corner portion of the sensor chip is released from the base as the plurality of pads of the sensor chip is arranged at a location a predetermined distance from the corner portion of the sensor chip,
the sensor chip has a detector area, in which the detector is disposed, defined by the movable part, and
at least one of the plurality of pads is arranged in the detector area of the sensor chip.

2. The dynamic quantity sensor according to claim 1, wherein
at least one of the plurality of pads is arranged at an approximately center position of the sensor chip such that the approximately center position of the sensor chip is connected to the base through the bump.

3. The dynamic quantity sensor according to claim 1, wherein
the detector further has a fixed part surrounded by the movable part,
the fixed part has a first electrode extending approximately parallel to a longitudinal direction of the movable part, and a second electrode extending in a direction opposite to the first electrode,
at least one of the plurality of pads is arranged on the fixed part located on an inner periphery of the movable part, and located between the first electrode and the second electrode of the fixed part, and
at least one of the plurality of the pads is arranged on the fixed part located on an outer periphery of the movable part.

4. The dynamic quantity sensor according to claim 1, wherein
the detector further has a fixed part opposing to the movable part,
the detector detects the dynamic quantity based on the capacitance variation between the movable part and the fixed part, and
at least one of the plurality of pads is arranged on the fixed part, and is located at an approximately center position of the detector area.

5. The dynamic quantity sensor according to claim 4, wherein
the movable part is driven to vibrate in a first direction,
the movable part is detected to vibrate due to a Coliolis force generated in a second direction approximately perpendicular to the first direction, when an angular velocity is applied to the movable part,
the pad arranged on the fixed part of the sensor chip is one of the plurality of pads, and
the plurality of pads is arranged in the first direction or the second direction.

6. The dynamic quantity sensor according to claim 1, wherein
the plurality of pads is arranged in a cross shape having an approximately center point of the sensor chip as a cross point of the cross shape.

7. The dynamic quantity sensor according to claim 6, wherein
the cross shape extends from the cross point toward each approximately center point of sides of the sensor chip.

8. The dynamic quantity sensor according to claim 1, wherein
the detector is constructed with a first detector and a second detector, which are symmetrical to each other relative to a line for dividing the sensor chip into two equal parts, and
the plurality of pads is arranged in the line.

9. The dynamic quantity sensor according to claim 8, wherein
the movable part in each of the first detector and the second detector is driven to vibrate in a first direction,
the movable part in each of the first detector and the second detector is detected to vibrate due to a Coliolis force generated in a second direction approximately perpendicular to the first direction, when an angular velocity is applied to the movable part,
the plurality of pads arranged in the line is arranged in the second direction.

10. The dynamic quantity sensor according to claim 1, wherein
a part of the plurality of pads is a dummy pad.

11. The dynamic quantity sensor according to claim 1, wherein
the detector and the plurality of pads are arranged on the same face of the sensor chip, and
the sensor chip is connected to the base through the bump such that the detector and the plurality of pads oppose to the base.

12. A dynamic quantity sensor comprising:
a base;
a sensor chip made of a rectangular board having a corner portion, the sensor chip including
a first detector and a second detector, which are symmetrical to each other relative to a first imaginary line for dividing the sensor chip into two equal parts, and
a plurality of pads; and
a bump for electrically and mechanically connecting the base and the plurality of pads of the sensor chip, wherein
each of the first and second detectors has a movable part, which is driven to perform a drive vibration in a first direction approximately perpendicular to the first imaginary line, and which is detected to perform a detection vibration due to a Coliolis force generated in a second direction approximately parallel to the first line when an angular velocity is applied to the movable part, such that the angular velocity is calculated based on a capacitance variation between the movable part and a fixed part opposing to the movable part,
some of the plurality of pads are arranged on the first imaginary line,
some of the plurality of pads are arranged in the first direction on a secondary imaginary line, thereby detecting the drive vibration or the detection vibration,
the corner portion of the sensor chip is released from the base,
the sensor chip has a detector area, defined by the movable part of each of the first and second detectors, and at least one of the plurality of pads is arranged in the detector area of the sensor chip.

13. A dynamic quantity sensor comprising:
a base;
a sensor chip made of a rectangular board having a corner portion, the sensor chip including
a detector, which is driven to perform a drive vibration in a first direction, and which is detected to perform a detection vibration due to a Coliolis force generated in a second direction approximately perpendicular to the first direction when an angular velocity is applied to the detector, such that the angular velocity is calculated based on a capacitance variation of the detector,
a plurality of pads; and
a bump for electrically and mechanically connecting the base and the plurality of pads of the sensor chip, wherein
the plurality of pads of the sensor chip is arranged in the first direction or the second direction to be at a location a predetermined distance from the corner portion of the sensor chip,
the sensor chip has a detector area, in which the detector is disposed, defined by a movable part of the detector, and
at least one of the plurality of pads is arranged in the detector area of the sensor chip.

14. The dynamic quantity sensor according to claim 12, wherein
at least one of the plurality of pads is arranged at an approximately center position of the sensor chip such that the approximately center position of the sensor chip is connected to the base through the bump.

15. The dynamic quantity sensor according to claim 12, wherein
the sensor chip has a detector area, in which each of the detectors is disposed, and
at least one of the plurality of pads is arranged in the detector area of the sensor chip.

16. The dynamic quantity sensor according to claim 12, wherein
each of the first detector and the second detector further has a fixed part surrounded by the movable part,
the fixed part has a first electrode extending approximately parallel to a longitudinal direction of the movable part, and a second electrode extending in a direction opposite to the first electrode, and
at least one of the plurality of pads is arranged on the fixed part located on an inner periphery of the movable part, and located between the first electrode and the second electrode of the fixed part, and
at least one of the plurality of pads is arranged on the fixed part located on an outer periphery of the movable part.

17. The dynamic quantity sensor according to claim 12, wherein
a part of the plurality of pads is a dummy pad.

18. The dynamic quantity sensor according to claim 13, wherein
at least one of the plurality of pads is arranged at an approximately center position of the sensor chip such that the approximately center position of the sensor chip is connected to the base through the bump.

19. The dynamic quantity sensor according to claim 13, wherein
the detector further has a fixed part surrounded by the movable part,
the fixed part has a first electrode extending approximately parallel to a longitudinal direction of the movable part, and a second electrode extending in a direction opposite to the first electrode, and
at least one of the plurality of pads is arranged on the fixed part located on an inner periphery of the movable part, and located between the first electrode and the second electrode.

20. The dynamic quantity sensor according to claim 13, wherein
a part of the plurality of pads is a dummy pad.

21. The dynamic quantity sensor according to claim 1, wherein
the detector further has a fixed part opposing to the movable part,
the detector detects the dynamic quantity based on the capacitance variation between the movable part and the fixed part, and
the plurality of pads are arranged on the fixed part along a line which imaginarily divides the sensor chip into two equal parts.

22. The dynamic quantity sensor according to claim 12, wherein
taken together, the some of the plurality of pads arranged in the first imaginary line and the some of the plurality of pads arranged in the first direction on a second imaginary line form a cross shape.

23. The dynamic quantity sensor according to claim 13, wherein
the detector further has a fixed part opposing to the movable part,
the capacitance variation is between the movable part and the fixed part, and
the plurality of pads are arranged on the fixed part along a line which imaginarily divides the sensor chip into two equal parts.

* * * * *